(12) United States Patent
Isenmann

(10) Patent No.: US 8,255,589 B2
(45) Date of Patent: Aug. 28, 2012

(54) RECOGNIZING TELEGRAM BOUNDARIES

(75) Inventor: Andreas Isenmann, Haslach i.K. (DE)

(73) Assignee: VEGA Grieshaber KG, Wolfach (DE)

(*) Notice: Subject to any disclaimer, the term of this patent is extended or adjusted under 35 U.S.C. 154(b) by 247 days.

(21) Appl. No.: 12/533,347

(22) Filed: Jul. 31, 2009

(65) Prior Publication Data

US 2010/0036974 A1 Feb. 11, 2010

Related U.S. Application Data

(60) Provisional application No. 61/087,278, filed on Aug. 8, 2008.

(30) Foreign Application Priority Data

Aug. 8, 2008 (EP) ..................................... 08162108

(51) Int. Cl.
*G06F 3/00* (2006.01)

(52) U.S. Cl. ......................................................... 710/17

(58) Field of Classification Search ...................... 710/17
See application file for complete search history.

(56) References Cited

U.S. PATENT DOCUMENTS

| | | | |
|---|---|---|---|
| 4,230,989 A | | 10/1980 | Buehrle |
| 6,032,203 A | * | 2/2000 | Heidhues ........................ 710/11 |
| 7,885,610 B2 | * | 2/2011 | Isenmann et al. ............... 455/73 |

OTHER PUBLICATIONS

Le et al. "Redundant Communication Avoidance for Event-Driven Wireless Sensor Network", IJCSNS International Journal of Computer Science and Network Security, vol. 7, No. 3, Mar. 2007, pp. 193-200.

* cited by examiner

*Primary Examiner* — Henry Tsai
*Assistant Examiner* — Juanito Borromeo
(74) *Attorney, Agent, or Firm* — Fay Kaplun & Marcin, LLP

(57) ABSTRACT

A measuring apparatus comprises a receiving device, a processing device and a sending device. The receiving device is adapted to receive at least one telegram fragment, and the receiving device is adapted to determine a destination of the at least one telegram fragment, and depending on the destination of the at least one telegram fragment to set an operating state of the processing device. The receiving device is furthermore adapted, from the at least one telegram fragment, to prepare a telegram block, wherein the processing device is adapted, in a first operating state, to determine a telegram boundary of the telegram block, and to determine a type of the telegram block. The processing device is equipped, in a second operating state, to determine a telegram boundary of the telegram block, and to control the sending device such that the sending device sends a telegram subsequent to the telegram boundary.

11 Claims, 1 Drawing Sheet

RECOGNIZING TELEGRAM BOUNDARIES

PRIORITY CLAIM

This application claims the benefit of the filing date of U.S. Provisional Patent Application Ser. No. 61/087,278 and EP Patent Application Serial No. 08 162 108.8, the disclosures of which are hereby incorporated herein by reference.

FIELD OF THE INVENTION

The present invention relates to the technical field of measuring technology. In particular, the present invention relates to a measuring apparatus, to a method for communicating between measuring apparatuses on a shared net infrastructure or on a shared network infrastructure, to a program element for communicating between measuring apparatuses on a shared network infrastructure, and to a computer-readable storage medium.

TECHNOLOGICAL BACKGROUND

In measuring technology, process data may be picked up or recorded in physical locations that may differ from those where this process data, for example measured values or process variables, may be subsequently displayed and further processed. For example, in an industrial plant, containers whose fill levels or pressures may be to be picked up can be distributed over an extended industrial area. The fill levels or pressures should, however, be able to be monitored from a central control room, and for these reasons the measured values or process variables may be transmitted from the locations of measuring to said central control room.

Various solutions for transmitting process data may exist. For example, dedicated lines may be able to be used in order to transmit process data by means of the 4-20 mA technology. The 4-20 mA technology may, for example, be used in two-wire measuring devices or four-wire measuring devices. In such measuring arrangements the material-related expenditure in particular for cabling may be high. In order to connect the dedicated lines of the measuring devices to a central control room, star-shaped cabling may be necessary.

Furthermore, bus systems may exist that may make it possible, on a common medium, a shared medium, a common net infrastructure or a bus, to distribute the process data to the sensors, actuators, field devices, control devices or process control computers or process main computers that in each case are connected to the bus. The commonly used bus and the shared bus, respectively may contribute to a reduction in materials and to minimising service and maintenance for the cabling. A net infrastructure may be a network infrastructure.

In recent times, radio systems may have been developed that may make it possible to essentially do without cabling or to abandon cabling, and instead of cabling to use the air as a so-called shared medium.

Since with using a shared medium it may be possible that each participant, each field device, each actuator or each sensor can access the shared medium, and thus to be able to occupy the shared medium, a rulebased procedure for access to the bus may have been developed. In order to make such a procedure or sequence possible, a bus participant or a field device may be configured as a so-called master, while other field devices may be configured as so-called slaves. The master may control the access to the bus, and in particular the access to a slave or to a plurality of slaves that may be connected to the shared medium.

In master-slave communication, a request telegram may be sent to a slave which slave can respond to this request telegram by means of a response telegram. If several slaves exist, or if a plurality of slaves exist, then these slaves may be able to be requested consecutively by the master.

If a master communicates with several slaves, then it may happen that a slave interprets the response of another slave as the beginning of a request telegram of the master. In order to essentially prevent such misinterpretation, an access regulation, an access ruling and access control, respectively to the shared medium may be necessary. Access control may consist in that each communication participant, prior to the dispatching of a request, or prior to the dispatching of a response, in each case may wait for a predetermined waiting time and waiting period, respectively before access to the shared medium can take place. Such a waiting period may also be referred to as a timeout period respectively timeout time. In other words, prior to the dispatching of a request or a response via the shared medium, a master and/or a slave may have to wait for a timeout period before access to the shared medium can take place.

To ensure that essentially all the communication participants that are connected to a shared medium and, in particular, that are involved in communication may be ready to receive at the point in time when at least one of the participants begins with the transmission of a telegram, a timeout control respectively a timeout regulation may be present in the field devices. This timeout control respectively this timeout control device may control or drive waiting for a timeout time predetermined by the respective system prior to dispatching the request or the response, in other words prior to access to the bus. However, as a result of this timeout time or waiting time the data throughput on the shared medium may be low.

There may thus exist a need to make more effective communicating between field devices possible.

SUMMARY OF THE INVENTION

According to an exemplary embodiment of the present invention, a measuring apparatus, a method for communicating between measuring apparatuses on a shared net infrastructure or on a shared network infrastructure, a program element for communicating between measuring apparatuses on a shared net infrastructure, and a computer-readable storage medium may be provided.

According to a specific exemplary embodiment of the present invention, the measuring apparatus may comprise a receiving device, a processing device and a sending device. The receiving device may be adapted for the receipt of at least one telegram fragment. In this arrangement the receiving device may be adapted such that the receiving device can determine a destination of the at least one telegram fragment. Furthermore, according to an exemplary embodiment of the present invention, the receiving device may be adapted, depending on the destination of the at least one telegram fragment, to set an operating state of the processing device. The receiving device may further be adapted, from the at least one telegram fragment, to prepare or compose a telegram block or an overall telegram and an entire telegram, respectively.

The processing device may be adapted so that in a first operating state it can determine a telegram boundary of the telegram block, and that it can determine a type of the telegram block.

Furthermore, the processing device may be adapted, in a second operating state, which may differ from the first operating state, to determine a telegram boundary of the telegram block, and to control respectively drive the sending device such that the sending device sends a telegram subsequent to the telegram boundary, i.e. immediately after the telegram block.

According to another exemplary embodiment of the present invention, a method may be implemented wherein the method may be used for communicating between measuring apparatuses on a shared net infrastructure or a shared medium. The method may comprise receiving at least one telegram fragment. The method may furthermore determine a destination of the at least one telegram fragment, and an operating state of a processing device may be set depending on the determined destination of the at least one telegram fragment.

Furthermore, the method may comprise the preparing or compiling of a telegram block from the at least one telegram fragment, wherein a telegram boundary of the telegram block may be determined. In particular, a beginning or an end of the telegram block may be determined. Furthermore, a type of the telegram block may be determined.

Determining the telegram boundary and determining the type of the telegram block may take place in a first operating state.

In a second operating state a telegram boundary of the telegram block may be determined, and a sending device may in the second operating state be driven such that the sending device may send a telegram essentially directly subsequent to the telegram boundary.

Sending a telegram subsequent to a telegram boundary may mean that essentially chronologically immediately after the shared medium, the bus or the air has become available and free, respectively, the sending device can commence sending a telegram. In particular, the air becoming available may mean that a radio channel or a radio transmission path has become available.

According to yet another exemplary embodiment of the present invention, a program element for communicating between measuring apparatuses on a shared net infrastructure may be created, which program element, when executed on a processor, may control a method for communicating between measuring apparatuses on a shared net infrastructure.

According to yet another exemplary embodiment of the present invention, a computer-readable storage medium may be provided, in which computer-readable storage medium a program for communicating between measuring apparatuses on a shared net infrastructure may be stored, which program, when executed on a processor, may control the method for communicating between measuring apparatuses on a shared infrastructure.

A computer-readable storage medium may be, for example, a floppy disk, a hard disk, a USB (Universal Serial Bus) storage medium, a RAM (Random Access Memory), a ROM (Read Only Memory) or an EPROM (Erasable Programmable Read Only Memory). Furthermore, a computer-readable storage medium may also be a communication network, for example the internet, which may make it possible to download a corresponding program code.

The two operating states which the measuring apparatus can assume may determine whether a received telegram fragment, and in particular whether a telegram block formed by at least one telegram fragment, may be intended for the respective measuring apparatus, or whether the telegram block may be intended for another measuring apparatus. Consequently, the operating state of the measuring apparatus may be able to decide whether the measuring apparatus assumes a passive state or an active state. In other words, this may mean that in a first operating state in which the measuring apparatus may be not addressed, the measuring apparatus may only passively listen to the action or to events on the bus, or may monitor and may record, respectively the telegram traffic on the bus. This monitoring or observing may make it possible to assume a ready-to-receive state essentially at the moment at which a first complete useful telegram and payload telegram, respectively can arise on the shared medium or on the bus.

Since the measuring apparatus may evaluate complete telegrams, recognizing telegram boundaries may make it possible to be ready to receive essentially precisely at that moment at which there may be a possibility of information that may be relevant to the measuring apparatus appearing on the bus. Consequently it may be preventable that information may be lost, which information might be of importance to interpreting of a telegram or of a telegram block. It may, for example, be possible to prevent missing the receiving of the beginning of a telegram, as a result of which the entire telegram might become unusable.

In the second operating state a known telegram fragment or a known telegram block in the measuring apparatus may have been recognized, and recognizing of the telegram boundary may make it possible in turn to send a telegram, for example a response telegram, essentially immediately on receipt of a complete telegram.

It may be considered to be an idea of the invention, by recognizing telegram boundaries, in particular by recognizing the beginning and/or the end of a telegram, to determine points in time at which the bus can be possessed. In other words, the points in time may be determined, in which a measuring apparatus, a slave or a master may have the bus at its disposal. By the direct stringing together of telegrams, gaps between the telegrams may be prevented, which gaps can, for example, arise as a result of waiting times and waiting periods, respectively. By recognizing telegram boundaries, a bus or a shared medium may thus be able to be used effectively. In particular in the case of field buses, recognizing telegram boundaries may make it possible to efficiently use the bus because asynchronous data transmission may take place on a field bus. There may thus be essentially no structured transmission taking place, in which structured transmission the telegrams are recognized on the basis of a frame structure.

Every measuring apparatus that may be configured as a slave apparatus or as a slave may be able to differentiate between a request telegram from a master, and a response telegram from another slave. Therefore, during communication between the response of a slave and a renewed request of a master it may be possible to do essentially without a timeout or a waiting time. Doing essentially without a waiting time may make it possible to achieve a high data throughput in a communication system. In particular, the high data throughput on a bus may be enabled.

In this context it may be possible to use the knowledge that a request telegram from a master may with high probability be followed by a response telegram from the addressed slave. Consequently, a slave that may recognize that a request telegram may not be destined for the slave may likewise be able to determine that a subsequent response signal may also not be destined for the slave. The slave may therefore remain in a passive state even if a telegram boundary of a request telegram has been recognized.

A passive slave, i.e. a slave which may not, be associated with a current communication relationship between a master and a slave, may thus prevent a situation in which the passive slave, after the bus has become free, i.e. after transmitting of the request telegram from a master to another slave, accesses the bus, because the passive slave may know that a response telegram from the slave may still follow from the communication relationship.

One prerequisite for receiving a telegram may be that a participant which may be intended to receive the telegram, e.g. a slave or a master, may be ready to receive, i.e. that the participant may be in a ready-to-receive state. Receiving may take place with receipt of a first byte. From the point in time of receiving the first byte onwards, essentially all the bytes which may be subsequently received may be collected to form an overall telegram. Collecting the telegram fragments may take place by means of a memory and storage, respectively in the participant. After each received byte, i.e. after each receiving of a byte it may be investigated whether a complete telegram, i.e. whether an overall telegram or a complete telegram block, was received.

An overall telegram or an entire telegram may be composed of a plurality of bytes, wherein each individual byte can represent a fragment of the overall telegram. One byte alone may, for example, represent an instruction for controlling a slave. For example, by means of an instruction the beginning of a measuring activity of the slave may be initiated.

Furthermore, an instruction, in particular an extensive instruction, may, however, comprise a plurality of bytes. For example, a message or an instruction for parameterising the slave may comprise a plurality of telegram fragments.

The slave can determine that an overall telegram may have been received in full, in that the format of the composed overall telegram may be compared to a stored sample of an overall telegram. Thus, the overall telegram may, for example, comprise an operation code that references the command to be carried out. Comparison in a list with this operation code or OP code, or the presence of an OP code at the predetermined locations, may make it possible to recognize the overall telegram, and in particular the boundaries of the overall telegram.

If an overall telegram may have been recognized, then the telegram may be processed. During processing it may be determined that the overall telegram may not yet be complete, wherein it may then be necessary to collect still further bytes.

A receiving routine may comprise a timeout that may correspond to a waiting time. This timeout may, for example, be a reverse counter from a predeterminable start value, which counter issues a message when the counter has been expired. For example, a timeout may be a countdown counter. A countdown counter may start counting from a predeterminable start value and may issue a message when the counter has been expired. The timeout may, for example, expire when for a defined time no further byte for an incomplete overall telegram has been received. When this timeout expires, all the already received bytes, and in particular the incomplete overall telegram, may be discarded, and receiving a new overall telegram may begin anew.

According to one aspect of the present invention, each slave, i.e. each measuring apparatus that may be configured as a slave, may also receive the response of another slave. In a bus network infrastructure or in a radio infrastructure in which a plurality of measuring apparatuses may access a common medium or a shared medium, the communication of other measuring apparatuses among themselves may be visible to a measuring apparatus or a measuring apparatus may be able to see the communication of other measuring apparatuses among themselves. In other words, communication, i.e. the exchange of telegrams, may be monitored or observed by a measuring apparatus. If individual telegrams that are dispatched via the shared medium may be interpreted and observed essentially without, however, actively participating in communication, it may become possible for a slave to be able to be ready to receive or to change to a ready-to-receive state immediately upon receipt of a complete response from another slave.

Likewise, after receipt of the response from a slave, a master may be able to immediately dispatch a further request or a further request telegram. The master may thus be able to do essentially without observing a waiting time, essentially without this possibly resulting in a collision of data packets. As a result of recognising telegram boundaries, a high data throughput may be able to be achieved. A situation may be avoided in which during communication between a master and several slaves a slave that may essentially not participate in this communication relationship interprets the response of one of the other slaves as being the beginning of a request telegram for the slave. By means of recognizing the telegram boundaries, it may be possible to do essentially without a timeout control for detecting such a misinterpretation.

A timer or a timeout control, a timeout control device and a timeout controller, respectively could be necessary so that each communication participant, i.e. each master or slave connected to a shared medium, prior to dispatching a request or prior to dispatching a response meets at least one timeout time or timeout period of the system as a waiting time or waiting period. By recognizing the telegram boundaries a situation may essentially be able to be prevented in which by means of a timeout control it may essentially have to be ensured that all the communication participants that are involved are reliably ready to receive when the telegram starts respectively at the time a telegram begins. Such a timeout or such a timeout control or timeout control device may be able to essentially be avoided by recognizing the telegram boundaries, because the waiting times may be able to be reduced.

In other words it may be an idea of the present invention, in each measuring apparatus that may be connected to a bus system to detect whether a telegram fragment received on the bus may be destined for the respective measuring apparatus. If the telegram fragment may be destined for a measuring apparatus, the measuring apparatus may assume an active role in a communication relationship, in other words the measuring apparatus may participate in the communication in that the measuring apparatus may dispatch request telegrams and/or response telegrams, and in that the measuring apparatus may interpret and process received telegrams. This active role may represent a second operating state.

Furthermore, the measuring apparatus may assume a first operating state or a passive operating state when the measuring apparatus may detect that the measuring apparatus may essentially not be involved in communication on the bus, i.e. when the measuring apparatus may detect that the measuring apparatus may essentially not participate in the communication. Nevertheless, in the passive state the measuring apparatus may observe the traffic on the bus in order to the measuring apparatus itself be able to access the bus, if required, preferably immediately after the bus becomes available.

The bus may, in particular, be a field device bus.

According to a further exemplary embodiment of the present invention, the receiving device may be adapted to determine the destination by means of an address.

The destination of a telegram fragment may be determined by way of an address, for example a destination address, which may be stored in the telegram fragment. The destination address may be a measuring apparatus or may refer to a measuring apparatus, wherein the measuring apparatus, by comparing its own address with the destination address of the telegram fragment, may determine whether a telegram fragment may be destined for the corresponding measuring apparatus. By means of the destination address the first operating state or the second operating state may thus be settable in the measuring apparatus.

According to another exemplary embodiment of the present invention, the processing device of the measuring apparatus may further be adapted, in the first operating state, for example the passive operating state, to determine the telegram boundary of a request telegram block and the telegram boundary of a response telegram block.

When the measuring apparatus may have recognized that a request packet or an inquiry packet that may essentially not be destined for the measuring apparatus may have been exchanged on the bus, the measuring apparatus may be able to recognize that in succession a response telegram may follow. This response telegram may also not be destined for the measuring apparatus. Consequently, the measuring apparatus may assume a ready-to-receive state essentially only after recognizing of a request telegram block and recognizing of a response telegram block.

It may thus be possible to avoid a situation in which a response telegram of another measuring apparatus may be interpreted as the beginning of a request telegram from the measuring apparatus. Recognizing the telegram boundaries of both the request telegram block and of the response telegram block may make it possible to change to a ready-to-send state essentially immediately upon receipt of the response telegram block of the other measuring apparatus.

According to yet another exemplary embodiment of the present invention, the receiving device and/or the sending device may in the first operating state be adapted in such a way that immediately upon recognizing the telegram boundaries the receiving device and/or the sending device may change to a ready-to-receive operating state and/or a ready-to-send operating state.

From the act of recognizing a response telegram, the measuring apparatus may be able to deduce that the bus is becoming available. After recognizing the response telegram, and in particular after recognizing the boundaries of the response telegram block of another measuring apparatus, in other words, for example, after recognizing of the end of the response telegram block, the measuring apparatus may be able both to receive messages destined for the measuring apparatus itself, and to the measuring apparatus itself dispatch messages to the bus.

According to yet another exemplary embodiment of the present invention, the receiving device and/or the sending device in the second operating state may be adapted to change to a ready-to-receive operating state and/or a ready-to-send operating state essentially immediately upon sending the telegram.

After a measuring apparatus, in response to a request telegram destined for the measuring apparatus or in response to a corresponding request telegram block, may have sent a response telegram block, it may be possible for the measuring apparatus to again receive or send telegrams.

According to yet another exemplary embodiment of the present invention, a telegram fragment may have the length of one byte.

Furthermore, the length of a telegram fragment may have the length of one word or of one double word. In a 2 k-Bit system a word may comprise 2 k Bit, and a double word may comprise 2 times 2 k Bit (2·2 k Bit). K may be the register length. One byte may comprise eight bits.

A byte may be the shortest length of an instruction in use which instruction may be in accordance with a field bus standard. An instruction or a command may be composed of several byte.

According to yet another exemplary embodiment of the present invention, the measuring apparatuses may be at least one measuring apparatus selected from the measuring apparatus consisting of a field device, an actuator, a sensor, an evaluation device, a gateway, a remote IO, a control device, a fill-level measuring device, a flow-through measuring device and a pressure measuring device.

According to yet another exemplary embodiment of the present invention, the measuring apparatus may be adapted for connecting to a bus and/or to a radio transmission path.

For example, the measuring apparatus may comprise an antenna or an MAU (Medium Access Unit) by means of which it may be possible both to receive signals from the bus, and to send signals to the bus.

According to yet another exemplary embodiment of the present invention, the measuring apparatus may be adapted to recognize errors by means of the expiring of timers or timeouts.

By means of the provisioning of timers it may be possible to prevent so-called deadlock states in which the measuring apparatus may have "hung up" itself. This may mean that the measuring apparatus may have assumed a state in which the method for communicating between measuring apparatuses has come to a halt and stalled, respectively. For example, a reset may have to be carried out in order to restart the method respectively to bring the method into a running state again.

It should be noted that different aspects or exemplary embodiments of the invention have been described with reference to different subject-matters. In particular, some exemplary embodiments have been described with reference to apparatus-type claims, whereas other exemplary embodiments have been described with reference to method-type claims. However, a skilled person can gather from the above description and from the description below that, unless otherwise described, additional to each combination of features that form part of a category of subject-matters, any combination of features that relate to different categories of subject-matters is also covered. In particular, combinations of features of device-related claims with features of apparatus-type claims are also intended to be disclosed.

BRIEF DESCRIPTION OF THE DRAWINGS

Below, further exemplary embodiments of the present invention are described with reference to the figures.

DETAILED DESCRIPTION

Figure 1:
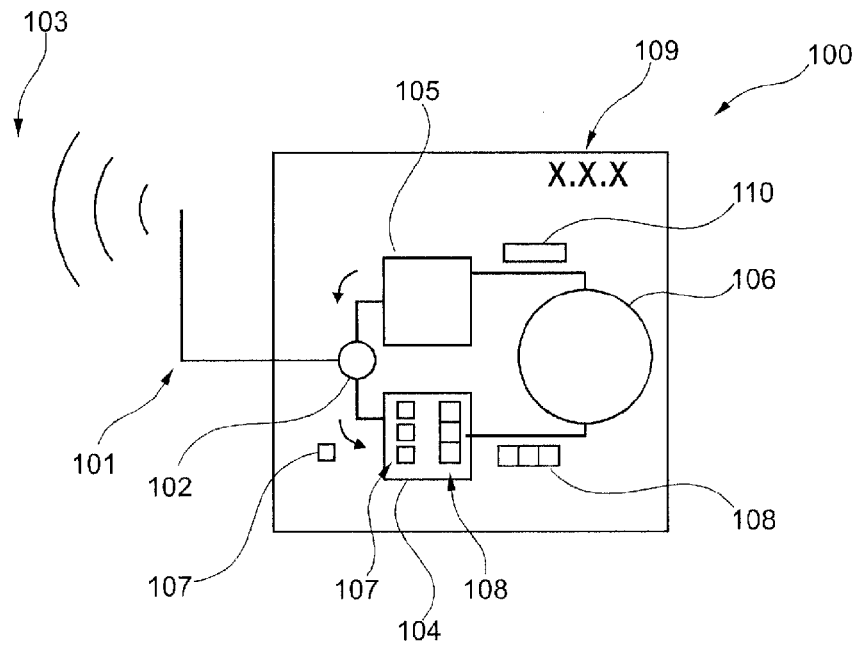
FIG. 1 shows a measuring apparatus according to an exemplary embodiment of the present invention.

The illustrations in the figures are diagrammatic and not to scale. In the following description of the figures the same reference numerals are used for identical or corresponding elements.

FIG. 1 shows a block diagram of a measuring apparatus 100 according to an exemplary embodiment of the present invention. This can be a field device 100, in particular a slave 100 or a master 100. A master 100 is a field device 100 that is configured as a master, for example an evaluation device 100, while a slave 100 is a field device that is configured as a slave, for example a sensor 100.

By sending request telegrams, query telegrams, instruction telegrams or command telegrams, the master 100 can control, address or interrogate a slave 100 or a plurality of slaves 100. Both the master 100 and a slave 100 have a terminal 101 or connection 101 by means of which they can be connected to a shared medium. In FIG. 1 the shared medium is the air which can be accessed by means of an antenna 101.

In the case of a physical or wire-bound bus, the terminal 101 or the interface 101 can be a terminal according to a field bus. A field bus can, for example, be a HART® bus, a Profibus or a Fieldbus Foundation™ bus. The terminal 101 can serve for receiving and for sending signals. In other words, the terminal 101 can be used both for receiving and for sending signals. The signals in turn can comprise the telegram fragments, overall telegrams or entire telegrams, wherein the telegrams in turn comprise measured values, instructions or other values responsible for controlling and regulating, respectively a measuring process.

In order to enable sending and receiving via a common or shared net infrastructure, the switch 102 is provided, which enables forwarding to the receiving device 104 any telegrams that arrive from the bus 103. On the other hand, the switch 102 makes it possible to forward to the bus 103 signals or telegrams that originate from the sending device 105. Both the receiving device 104 and the sending device 105 are connected to the switch 102 or the switch point 102.

Furthermore, the receiving device 104 and the sending device 105 are connected to the processing device 106. The processing device 106 serves to recognize telegram boundaries. For this purpose, the processing device receives a composed telegram block from the receiving device 104. The processing device 106 may belong to a higher logical layer than the receiving device 104 or the sending device 105. A telegram block composed of several telegram fragments may thus be passed from a lower logical layer to a higher logical layer.

The receiving device 104 receives the telegram fragments 107 from the bus 103 via the terminal 101 or via the interface 101 and via the switch 102, and from said telegram fragments 107 the receiving device 104 composes an overall telegram 108, which overall telegram 108 the receiving device 104 forwards to the processing device 106 for further processing. The receiving device 104 also recognizes the destination of a telegram fragment 107, wherein the telegram fragment 107 comprises, for example, a destination address. The receiving device 104 compares the destination address of a telegram fragment 107, for example, with the address 109 configured in the measuring apparatus 100.

If the destination address of a telegram fragment 107 matches the field device address 109 or the address 109 of the measuring apparatus, the processing device 106 and in particular the measuring apparatus 100 changes to the active operating state, i.e. to the second operating state. The processing device 106 interprets the telegram blocks 108 or the telegram block 108 if the processing device 106 is in this second operating state, and dispatches a response packet 110 via the sending device 105, the switch 102 and the interface 101.

If the destination address of a telegram fragment 107 does not match the measuring apparatus address 109, the processing device 106, in particular the measuring apparatus 100, changes to a first operating state, i.e. to the passive operating state. In the passive operating state the measuring apparatus 100 observes the telegrams 108 and determines the telegram boundaries, for example the beginning and/or the end of the telegram 108, with the intention of determining when the bus 103 is available or will become available. In other words, the point in time at which the bus 103 is available or will become available can be determined.

Figure 2:
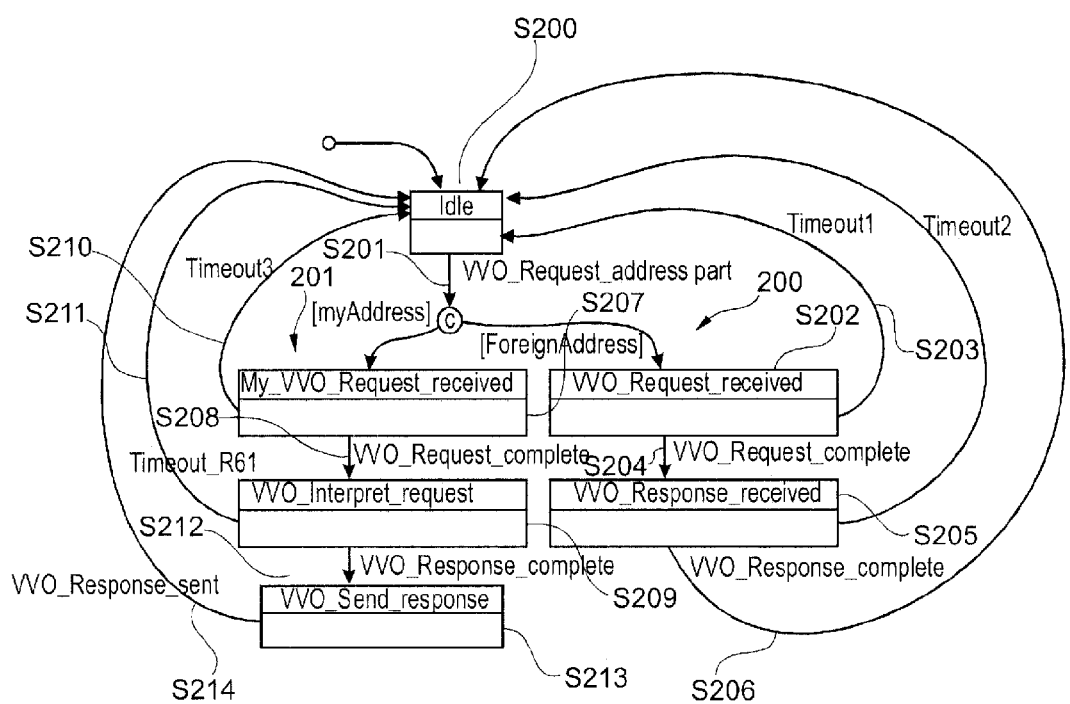
FIG. 2 shows a message flow chart for controlling a method for communicating of measuring apparatuses on a shared network infrastructure according to an exemplary embodiment of the present invention.

The method for communicating between measuring apparatuses on a shared network infrastructure according to an exemplary embodiment of the present invention is shown in the message flow chart of FIG. 2. In a first state S200, the idle state, the measuring apparatus 100 is ready to receive and/or ready to send.

Interpreting the destination of a telegram fragment, in particular of a telegram block, follows in step 209. In FIG. 2 this step is designated VVO_Request_address part. VVO may denote VEGA® Visual Operating.

After the interrogation and the request, respectively in step S201, a decision is made as to whether the system or the measuring apparatus 100 is in the first operating state 200 or whether it is in the second operating state 201.

After the interrogation in step S201, the measuring apparatus 100 reaches the first operating state if it is detected that the telegram fragment belongs to a foreign communication relationship, with said telegram fragment thus comprising a destination address that differs from the address 109 of the measuring apparatus. This step is designated [foreignAddress] in FIG. 2.

If the destination address matches the measuring apparatus address 109, the system reaches the second state 201, which is marked with the designation [myAddress].

Below, the first operating state 200, i.e. a passive operating state, is described.

After it has been detected that the measuring apparatus address 109 does not match the destination address of a telegram fragment 107, the method reaches the state S202, VVO_Request_received. In this state it is determined that a request packet has been completely received on the bus, but that this request packet, request telegram or request message does not belong to the measuring apparatus 100. However, the measuring apparatus 100 can also interpret the foreign overall telegram, i.e. the overall telegram that belongs to the foreign communication relationship, and the measuring apparatus 100 can, in particular, determine the telegram boundaries. Thus the beginning and the end of a request packet can be determined.

In order to prevent an error scenario from occurring, in step S203 a first timer timeout 1 is provided, which expires unless a complete telegram was able to be determined within a predeterminable time or within a predetermined period of time. On expiration of the timer timeout 1, the system reaches again the state S200, i.e. the ready-to-receive state. In other words, the system reaches again the state S200 when timer timeout 1 has elapsed. A partial packet that has not yet been completely received is discarded.

After determining of the request, in step S204, VVO_Request_complete, a determination is made as to whether this is a complete request packet, and if it is a complete request packet, a jump to state S205 takes place, in which a determination is made as to whether an associated response telegram can be recognized on the bus.

The timer timeout 2 expires when in state S205 the response packet is an incompletely received response packet. The timeout 2 or the timer 2 can be used to set the slave again to the ready-to-receive state S200 if the response telegram from the addressed slave was not completely received.

The response telegram that is treated in step S205 belongs to a foreign measuring apparatus or to another measuring apparatus. When the response telegram that is associated with the request from step S202 has been received correctly, both the received request telegram and the received response telegram are discarded in step S206, and essentially immediately after recognizing the response telegram, and in particular after recognizing the telegram boundaries, i.e. of the telegram end, a jump to the idle state S200 takes place (VVO_Response_complete).

The measuring apparatus 100 is thus able to determine when the measuring apparatus 100 is to change again to a ready-to-receive state or a ready-to-send state S200, although the measuring apparatus 100 does not participate in the communication relationship. In other words, the point in time at which the measuring apparatus 100 is intended to change again to a ready-to-receive state or a ready-to-send state S200 can be determined. As a result of the sequentially executing of the steps S202 and S205, i.e. of the awaiting the receiving of a response telegram in reply to a request telegram, a situation may be avoided in which a part of the response telegram is interpreted as a request telegram. Furthermore, a situation may be avoided wherein, except for the presence of an error, a premature jump to the idle state S200 takes place.

Below, the second operating state S201 or the active operating state is described.

After recognizing that the destination address of the telegram fragment 107 is the measuring apparatus address 109 or the own address 109 ([myAddress]) a jump from step S201 to state S207 takes place. This state S207 is designated My_VVO_Request_received.

In state S207 an overall telegram is composed of individual telegram fragments 107 until a request telegram is complete. In other words, on recognizing the boundaries of a request telegram, in step S208 a change takes place to the state VVO_Interpret_request, S209. The transition S208 is designated VVO_Request_complete.

In state S207 the timer Timeout 3 expires in the case that not sufficient bytes or an adequate number of telegram fragments have been received within a predeterminable time for composing a complete request packet in step S207. In other words, in state S207 the timer Timeout 3 runs down unless a sufficient number of bytes or an adequate number of telegram fragments have been received within a predeterminable period of time for composing a complete request packet in step S207. After expiring of the Timeout 3, in step S210 a jump back to the idle state S200 takes place.

A complete request packet, i.e. a request telegram in which it has been possible to recognize the telegram boundaries, is interpreted in step S209, VVO_Interpret_request. During interpreting it is, for example, determined whether there is a valid OP code, and what actions are demanded.

Timeout R61 is provided in step S211 in order to prevent the master from sending a response when the time or period of time during which a master is able to send a response has expired or elapsed. Such sending could lead to overlapping of telegrams on the bus.

After the master has sent a request to a slave, the master waits for a defined time or for a defined period of time for the reply. Upon expiration of this time or of this period of time, the master sends the next request and is thus no longer ready to receive.

To the associated slave this means that only a defined time window is available for sending the response. This time window is determined by means of Timeout_R61. Timeout_61 or Timeout_R61 thus prevents a situation in which the slave no longer sends the response but discards the response if the time required for generating the response exceeds this time window. In other words, Timeout_R61 can prevent a situation in which the slave continues to send a response in a case when the time required for generating the response exceeds this time window and after expiration of Timeout_R61 the response is discarded.

If the request that originates from a master has been interpreted in step S209, and a corresponding response telegram has been prepared, in Step S212 a complete response signal is handed over and transferred, respectively, to the sending device 105, which step in FIG. 2 is designated VVO_Response_complete. Thereafter the measuring apparatus 100, which in the case of FIG. 2 is a slave 100, reaches state S213 in which by means of the sending device 105 a response signal is sent upon the request telegram that has been received.

By means of recognizing the boundaries of the request telegram it is possible to send the response telegram essentially immediately after the request telegram in order to, preferably utilise the free bus or the available bus, VVO_Send_response S213.

In step S214, VVO_Response_sent, immediately after the dispatching of the response telegram, i.e. after recognizing the telegram boundary of the response telegram, in particular after recognizing the end of the response telegram, a jump to the ready-to-receive or ready-to-send state S200 takes place in order to make possible fast responding to any further request and in order to utilise the shared bus.

Consequently, after responding, a slave can again immediately get or go to a receiving mode, and after sending, a master can immediately wait for a response. Each slave 100 can thus differentiate between a request telegram from the master and the response telegram of another slave, and thus during the entire communication between the response of another slave S205 and a renewed request of the master S200 it is possible to do essentially without a timeout in the master for detecting a free bus 103. In this way a high data throughput can be achieved.

In addition, it should be pointed out that "comprising" does not exclude other elements or steps, and "a" or "one" does not exclude a plurality. Furthermore, it should be pointed out that features or steps which have been described with reference to one of the above exemplary embodiments can also be used in combination with other features or steps of other exemplary embodiments described above. Reference numerals in the claims are not to be interpreted as limitations.

What is claimed is:
1. A measuring apparatus, comprising:
a receiving device;
a processing device; and
a sending device;
wherein the receiving device receives at least one telegram fragment;
wherein the receiving device determines a destination of the at least one telegram fragment and, depending on the destination of the at least one telegram fragment, setting an operating state of the processing device;
wherein the receiving device prepares a telegram block from the at least one telegram fragment;
wherein the processing device, in a first operating state, determines a telegram boundary of the telegram block and a type of the telegram block;
wherein the processing device, in a second operating state, determines a telegram boundary of the telegram block and drives the sending device such that the sending device sends a telegram subsequent to the telegram boundary,
wherein the receiving device determines the destination using an address,
wherein the measuring apparatus changes to the first operating state if the destination address of the telegram fragment does not match the measuring apparatus address, and wherein the processing device, in the first operating state, determines the telegram boundary of a request telegram block and the telegram boundary of a response telegram block of another measuring apparatus.

2. The measuring apparatus according to claim 1, wherein at least one of the receiving device and the sending device, in the first operating state, immediately upon recognizing the telegram boundary, changes a state to at least one of (a) a ready-to-receive state and (b) a ready-to-send state.

3. The measuring apparatus according to claim 1, wherein at least one of the receiving device and the sending device, in the second operating state, immediately upon sending the telegram, changes to a state to at least one of (a) a ready-to-receive operating state and (b) a ready-to-send operating state.

4. The measuring apparatus according to claim 1, wherein the telegram fragment has the length of one byte.

5. The measuring apparatus according to claim 1, wherein the measuring apparatus is at least one measuring apparatus selected from the group of measuring apparatuses consisting of a field device, an actuator, a sensor, an evaluation device, a gateway, a remote IO, a control device, a fill-level measuring device, a flow-through measuring device and a pressure measuring device.

6. The measuring apparatus according to claim 1, wherein the measuring apparatus connects to at least one of a bus and a radio transmission path.

7. The measuring apparatus according to claim 1, wherein the measuring apparatus recognizes errors by expiring of timers.

8. The measuring apparatus according to claim 1, wherein at least one of the at least one telegram fragment and the telegram block conforms to at least one of the bus standards selected from the group of bus standards consisting of the HART® bus standard, Profibus standard and a Fieldbus Foundation™ standard.

9. A method for communicating between measuring apparatuses on a shared network infrastructure, comprising:
   receiving at least one telegram fragment;
   determining a destination of the at least one telegram fragment by using a destination address and setting an operating state of a processing device depending on the destination of the at least one telegram fragment;
   preparing a telegram block from the at least one telegram fragment;
   determining a telegram boundary of the telegram block and a type of the telegram block in a first operating state; and
   determining a telegram boundary of the telegram block and driving a sending device in a second operating state such that the sending device sends a telegram subsequent to the telegram boundary,
   wherein the measuring apparatus changes to the first operating state if the destination address of the telegram fragment does not match the measuring apparatus address, and
   wherein the processing device, in the first operating state, determines the telegram boundary of a request telegram block and the telegram boundary of a response telegram block of another measuring apparatus.

10. A program element embodied on a non-transitory computer readable medium for communicating between measuring apparatuses on a shared network infrastructure, which program element, when executed on a processor, controls the following method:
   receiving at least one telegram fragment;
   determining a destination of the at least one telegram fragment by using a destination address;
   setting an operating state of a processing device depending on the destination of the at least one telegram fragment;
   preparing a telegram block from the at least one telegram fragment;
   determining a telegram boundary of the telegram block and a type of the telegram block in a first operating state; and
   determining a telegram boundary of the telegram block and driving a sending device in a second operating state such that the sending device sends a telegram subsequent to the telegram boundary,
   wherein the measuring apparatus changes to the first operating state if the destination address of the telegram fragment does not match the measuring apparatus address, and
   wherein the processing device, in the first operating state, determines the telegram boundary of a request telegram block and the telegram boundary of a response telegram block of another measuring apparatus.

11. A non-transitory computer-readable storage medium in which a program for communicating between measuring apparatuses on a shared network infrastructure is stored, which program, when executed on a processor, controls the following method:
   receiving at least one telegram fragment;
   determining a destination of the at least one telegram fragment by using a destination address and setting an operating state of a processing device depending on the destination of the at least one telegram fragment;
   preparing a telegram block from the at least one telegram fragment;
   determining a telegram boundary of the telegram block and a type of the telegram block in a first operating state; and
   determining a telegram boundary of the telegram block and driving a sending device in a second operating state such that the sending device sends a telegram subsequent to the telegram boundary,
   wherein the measuring apparatus changes to the first operating state if the destination address of the telegram fragment does not match the measuring apparatus address, and
   wherein the processing device, in the first operating state, determines the telegram boundary of a request telegram block and the telegram boundary of a response telegram block of another measuring apparatus.

* * * * *